(12) United States Patent
Yuffe et al.

(10) Patent No.: US 6,747,475 B2
(45) Date of Patent: Jun. 8, 2004

(54) METHOD AND APPARATUS FOR DRIVING A SIGNAL USING SWITCHABLE ON-DIE TERMINATION

(75) Inventors: Marcelo Yuffe, Binyamina (IL); Zelig Wayner, Haifa (IL); Noam Yosef, Haifa (IL)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 10/024,119

(22) Filed: Dec. 17, 2001

(65) Prior Publication Data

US 2003/0112751 A1 Jun. 19, 2003

(51) Int. Cl.$^7$ ............................................. H03K 19/003
(52) U.S. Cl. ................................... 326/30; 326/26
(58) Field of Search ............................... 326/30, 26–27, 326/82–83, 86; 327/108–109

(56) References Cited

U.S. PATENT DOCUMENTS

| | | | |
|---|---|---|---|
| 5,661,415 A | | 8/1997 | Aoki et al. |
| 5,661,416 A | | 8/1997 | Takada et al. |
| 5,731,711 A | * | 3/1998 | Gabara ........................ 326/30 |
| 6,054,881 A | * | 4/2000 | Stoenner ..................... 327/112 |
| 6,075,383 A | | 6/2000 | Terletzki |
| 6,222,389 B1 | * | 4/2001 | Williams ..................... 326/86 |
| 6,351,136 B1 | * | 2/2002 | Jones et al. ................. 326/30 |

FOREIGN PATENT DOCUMENTS

| EP | 0 883 247 A2 | 12/1998 |
|---|---|---|
| WO | PCT/US02/39271 | 12/2002 |

OTHER PUBLICATIONS

Kudoh J et al.: "A CMOS Gate Array With Dynamic–Termination GTL I/O Circuits" International Conference on Computer Design: VLSI in Computers and Processors. Austin, Oct. 2–3, 1995, New York, IEEE, US.

International Search Report Apr. 15, 2003.

* cited by examiner

*Primary Examiner*—James H. Cho
(74) *Attorney, Agent, or Firm*—Blakely, Sokoloff, Taylor & Zafman LLP

(57) ABSTRACT

A circuit for driving and receiving signals on a bus line includes a pull-up switch and a pull-down switch. The pull-up switch has an impedance that matches the characteristic impedance of the bus line. The pull-down switch has an impedance of about half of the characteristic impedance of the bus line. When the circuit is receiving a signal or driving a logic high signal on the bus line, the pull-up switch is enabled so that the bus line voltage is pulled up, while the pull-down switch is disabled to prevent the pull-down switch from pulling down the bus line voltage. When the circuit is driving a logic low signal on the bus line, the pull-down switch is enabled so that the bus line voltage is pulled down, while the pull-up switch is disabled to prevent the pull-up switch from pulling up the bus line voltage.

17 Claims, 3 Drawing Sheets

METHOD AND APPARATUS FOR DRIVING A SIGNAL USING SWITCHABLE ON-DIE TERMINATION

FIELD OF THE INVENTION

The field of invention relates to electronic circuitry in general; and, more specifically, to driver/receiver circuits. Still more particularly, the present invention relates to driver/receiver circuits for use in assisted Gunning transceiver logic (AGTL)-type buses.

BACKGROUND

Some high-speed electronic applications use assisted Gunning transceiver logic (AGTL) type buses. An AGTL-type bus is a multi-drop bus with resistive bus line terminations. FIG. 1 shows a conventional AGTL-type bus system 10 having 50 Ω resistors 11 and 12, driver/receiver circuits 13–15 and a bus line 16 of an AGTL-type bus. In this example, driver/receiver circuits 13–15 are part of chips or agents (not shown) connected to bus line 16, which is an AGTL+ bus. Each bus line of an AGTL+ bus typically has a characteristic impedance of about 50 Ω (represented by transmission line symbols 16A in FIG. 1). Further, an AGTL+ bus typically operates at 1.5 volts, although other voltages can be used. In this example, driver/receiver circuits 13–15 each provide a 12.5 Ω resistive path to the ground line when driving a logic low signal onto bus line 16.

The elements of system 10 are interconnected as follows. Driver/receiver circuit 13 is connected to an end 17 of bus line 16 and to the ground line. End 17 is resistively terminated with resistor 11, which is connected to a VCC line. Driver/receiver circuit 14 is connected to a node 18 of bus line 16 and to a ground line. Unlike end 17, node 18 is not connected to the VCC line through a 50 Ω resistor. Driver/receiver circuit 15 is connected to an end 19 of bus line 16 and to the ground line. End 19 is connected to the VCC line through resistor 12. The other bus lines of the AGTL-type bus would have similarly placed driver/receiver circuits. Further, in an AGTL+ bus, the resistor is "on-die" on the chips that are connected at the extremes of the line. In addition, these resistors are "constant" in that they are configured to constantly pull-up the bus line during operation.

Although system 10 can achieve relatively high data rates, the resistive terminations of the AGTL-type bus dissipate power when system 10 is powered, especially when a driver/receiver is pulling a bus line to a logic low level. In addition, the resistance (i.e., the Thevenin equivalent impedance of the 50 Ω resistor and receiver/driver circuit) at each end of a bus line of AGTL-type bus is not well matched with the characteristic impedance of the bus line. For example, when driver/receiver circuit 13 drives a logic low level onto bus line 16, the equivalent impedance of the 12.5 Ω pull-down path of the driver/receiver and the 50 Ω pull-up path of resistor 11 is about 10 Ω. This mismatched termination undesirably tends to cause reflections that degrade the signal quality of the signals driven on bus line 16. Still further, in some AGTL-type buses, the resistors are connected externally to the chips. This connection results in a stub between the input buffer of the chip and the termination resistor, which can further degrade the signal quality.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
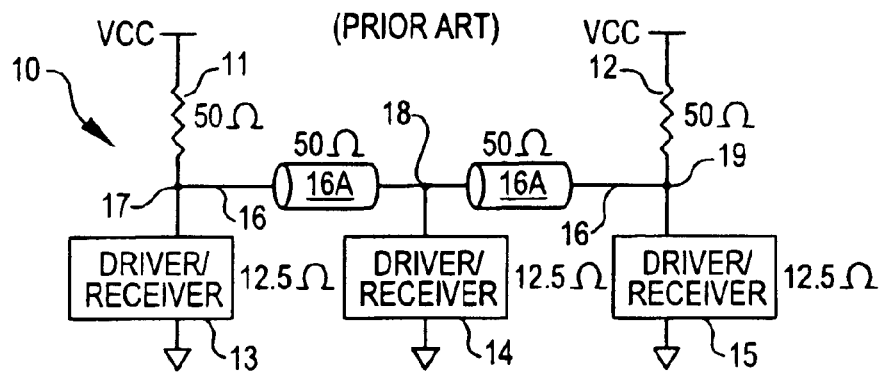
FIG. 1 (prior art) is a simplified block diagram illustrating a conventional AGTL-type bus system.
Figure 2:
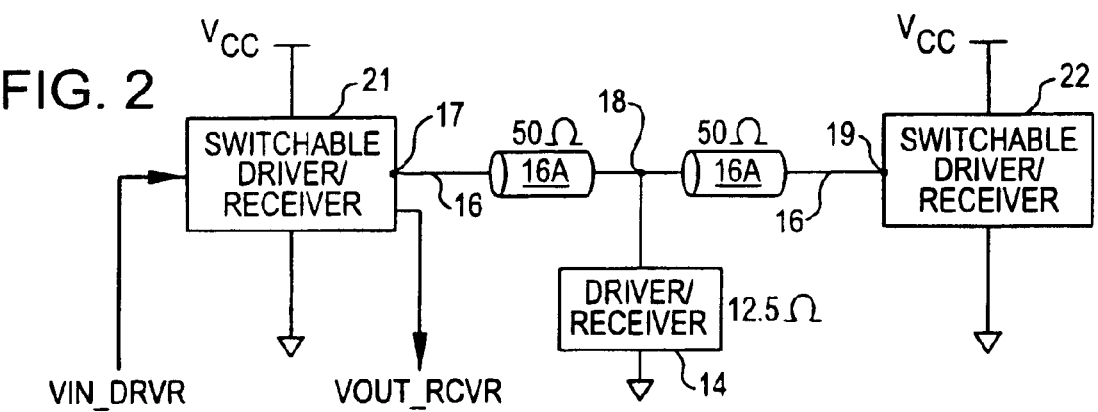
FIG. 2 is a block diagram illustrating a multi-drop AGTL-type bus system with switchable termination, according to one embodiment of the present invention.

FIG. 2 illustrates a multi-drop assisted Gunning transceiver logic (AGTL)-type bus system 20, according to one embodiment of the present invention. System 20 is substantially similar to system 10 (FIG. 1) except that: (a) constant resistors 11 and 12 are eliminated; and (b) driver/receiver circuits 13 and 15 (FIG. 1) at the ends of bus line 16 are respectively replaced with switchable driver/receiver circuits 21 and 22. Thus, this embodiment includes switchable driver/receiver circuits 21 and 22, bus line 16 (of an AGTL-type bus), and driver/receiver circuit 14 (as in FIG. 1). In one embodiment, bus line 16 is part of an AGTL+ bus. In other embodiments, bus line 16 can be part of a standard AGTL bus. Driver/receiver circuit 14 and switchable driver/receiver circuits 21 and 22 are formed on different agents (e.g., on different dies). For example, one agent can be part of a processor, the second agent can be part of a memory controller, and the third agent can be external cache memory device, another processor, a testability chip or any other kind of chip. In other embodiments, additional driver/receiver circuits essentially identical to driver/receiver circuit 14 of other agents may be connected to bus line 16 between switchable driver/receiver circuits 21 and 22.

The elements of this embodiment of system 20 are interconnected as follows. Switchable driver/receiver circuit 21 is connected to end 17 of bus line 16. In addition, switchable driver/receiver circuit 21 is connected to a VCC line (also referred to herein as a power line) and a ground line. Driver/receiver circuit 14 is connected to node 18 of bus line 16 and to the ground line. Switchable driver/receiver circuit 22 is connected to end 19 of bus line 16 and to the ground line. In this embodiment, in addition to driving and receiving signals, switchable driver/receiver circuit 21 and 22 are also used to provide on-die termination (ODT) for bus line 16.

In accordance with the present invention, switchable driver/receiver circuits 21 and 22 are asymmetric in that they each provide a pull-up and a pull-down path having different impedances when in a driver mode (as opposed to a receiver mode). These pull-up and pull-down paths are used to pull-up or pull-down the voltage level of bus line 16. As described in more detail below, this feature helps improve impedance matching at the ends of an AGTL-type bus.

Further, in accordance with the present invention, the switchable driver/receiver circuits provide the pull-up and pull-down paths in a substantially mutually exclusive manner (i.e., the pull-up path is disabled when the pull-down path is enabled, and vice versa). This feature helps reduce power dissipation compared to conventional AGTL-type bus systems that use constant termination resistors.

Figure 2A:
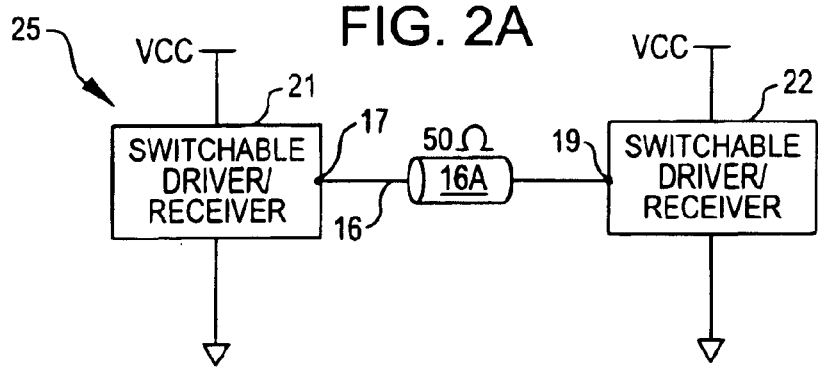
FIG. 2A is a block diagram illustrating a point-to-point AGTL-type bus system, according to another embodiment of the present invention.

FIG. 2A illustrates a point-to-point AGTL-type bus system 25, according to one embodiment of the present invention. System 25 is substantially similar to multi-drop AGTL-type bus system 20 (FIG. 2), except that driver/receiver circuit 14 (FIG. 2) is omitted.

Figure 3:
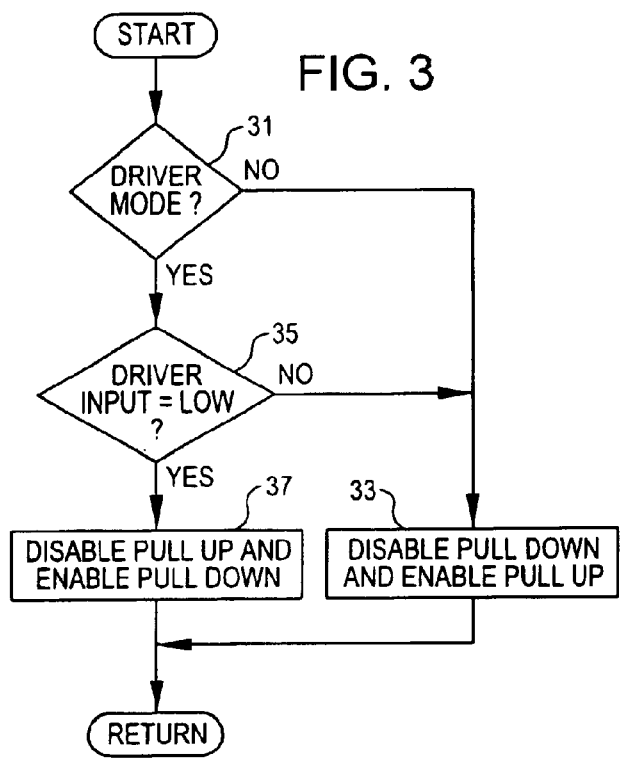
FIG. 3 is a flow diagram illustrating the operation of a switchable driver/receiver circuit of FIG. 2, according to one embodiment of the present invention.

FIG. 3 illustrates the operation of switchable driver/receiver circuit 21 (FIGS. 2 and 2A), according to one embodiment of the present invention. Moreover, because switchable driver/receiver circuits 21 and 22 are substantially identical, the following description can also apply to circuit 22 (allowing for differences in reference numbers). Referring to FIGS. 2, 2A and 3, switchable driver/receiver circuit 21 operates as follows.

Switchable driver/receiver circuit 21 can operate in one of at least two modes; i.e., a driver mode and a receiver mode. In the receiver mode, switchable driver/receiver circuit 21 provides a resistive termination at end 17 of bus line 16. In the driver mode, switchable driver/receiver circuit 21 drives either a logic high or logic low signal onto bus line 16. An AGTL-type bus requires that a logic low level should be at least one third of the VCC voltage level. Switchable driver/receiver circuit 21 is configured into the driver or receiver mode in response to one or more input signals to be outputted by the agent containing the circuit onto bus line 16. In this embodiment, the agent provides a signal VIN_DRVR that: (a) configures switchable driver/receiver circuit 21 into either driver or receiver mode; and (b) causes the circuit to drive either a logic high or logic low signal onto bus line 16. In other embodiments, a separate control signal can be used to configure switchable driver/receiver circuit 21 into the driver or receiver modes, and a separate data signal to be driven by the circuit onto bus line 16. This operation is represented by a block 31.

If switchable driver/receiver circuit 21 is in the receiver mode, it will provide a resistive termination to bus line 16. In this embodiment, signal VIN_DRVR will cause switchable driver/receiver circuit 21 to disable the aforementioned pull-down path and enable the aforementioned pull-up path. The pull-up path, in this embodiment, has a resistance of about 50 Ω. Because the pull-down path is disabled (e.g., by providing an open circuit or an impedance that is several orders of magnitude greater than 50 Ω in the pull-up path), the equivalent resistance at end 17 of bus line 16 essentially remains at 50 Ω, matching the characteristic impedance of bus line 16. This operation is represented by a block 33.

On the other hand, if switchable driver/receiver circuit 21 is in the driver mode, it will detect whether the signal to be driven onto bus line 16 is a logic low or logic high signal. In this embodiment, if signal VIN_DRVR is at a logic high level, then switchable driver/receiver circuit 21 will drive a logic high signal onto bus line 16. Similarly, if signal VIN_DRVR is at a logic low level, it will drive a logic low signal onto bus line 16. This operation is represented by a block 35.

As previously described, switchable driver/receiver circuit 21 can drive a logic high or logic low signal onto bus line 16. In this embodiment, switchable driver/receiver circuit 21 drives a signal onto bus line 16 as a function of the logic level of signal VIN_DRVR. This operation is represented by a block 35.

If the signal to be driven onto bus line 16 is to be a logic high signal, switchable driver/receiver circuit 21 disables the pull-down path and enables the pull-up path. In this embodiment, switchable driver/receiver circuit 21 performs the same operations in the receiver mode (see block 31) as in driving a logic high signal onto bus line 16. Thus, as previously described, switchable driver/receiver circuit 21 provides an equivalent impedance at end 17 of bus line 16 that substantially matches the characteristic impedance of bus line 16, thereby reducing reflections. This operation is again represented by block 33.

In contrast, if the signal to be driven onto bus line 16 is to be a logic low signal, switchable driver/receiver circuit 21 disables the pull-up path and enables the pull-down path. In this embodiment, switchable driver/receiver circuit 21 provides the pull-down path through a resistance of about 25 Ω. Further, because the pull-up path is disabled (e.g., by providing an open circuit or an impedance that is several orders of magnitude greater than 25 Ω in the pull-down path), the equivalent resistance at end 17 of bus line 16 essentially remains at 25 Ω. This 25 Ω equivalent resistance at end 17 is significantly closer to the 50 Ω characteristic impedance of bus line 16 than the approximately 10 Ω equivalent resistance of driver/receiver circuit 13 (FIG. 1). Thus, switchable driver/receiver circuit 21 can advantageously reduce reflections that degrade signal quality relative to conventional resistor terminations. This operation is represented by a block 37.

As previously described, switchable driver/receiver circuit 22 operates in essentially the same manner as described above for switchable driver/receiver circuit 21. Further, in multi-drop bus system 20, driver/receiver circuit 14 operates as in a conventional AGTL-type bus with essentially identical performance because switchable driver/receiver circuits 21 and 22 provide, in effect, 50 Ω resistive terminations at ends 17 and 19 of bus line 16 when they are in the receiver mode.

Figure 4:
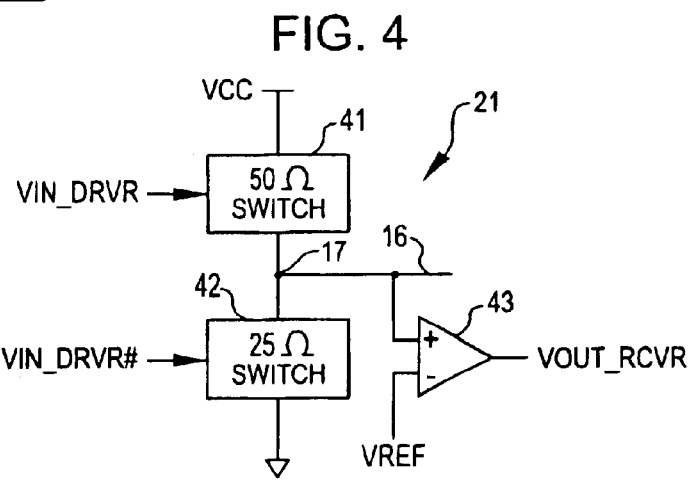
FIG. 4 is a block diagram illustrating an implementation of a switchable driver/receiver circuit of FIG. 2, according to one embodiment of the present invention.

FIG. 4 illustrates an implementation of switchable driver/receiver circuit 21 (FIGS. 2 and 2A), according to one embodiment of the present invention. In this embodiment, switchable driver/receiver circuit 21 includes a switch unit 41, a switch unit 42 and an amplifier 43. In other embodiments, any suitable detector circuit can be used to detect the logic level of the voltage on bus line 16.

In this embodiment, when enabled, switch units 41 and 42 provide conductive paths with 50 Ω and 25 Ω impedances, respectively. When disabled, switch units 41 and 42 provide, in effect, an open circuit. In other embodiments, switch units 41 and 42 may provide conductive paths with different impedances when enabled. In general, these impedances depend on the characteristic impedance of the bus line. For example, switch unit 41 can provide an impedance that is selected by trading off signal quality vs. power dissipation. Closely matching the characteristic impedance of bus line 16 tends to reduce reflections and improve signal quality while power dissipation can be reduced by increasing impedance.

The impedance of switch unit 42 can be selected by trading off signal quality vs. signal swing between logic high and logic low level. Increasing the signal swing tends to increase noise margin. In this embodiment of switchable driver/receiver circuit 21, decreasing the impedance of switch unit 42 or otherwise increasing the difference in impedance between switch units 41 and 42 can increase signal swing. However, decreasing the impedance of switch unit 42 will tend to increase in the mismatch between the equivalent impedance of switch unit 42 (while driving a logic low signal onto bus line 16) and the characteristic impedance of bus line 16, which in turn degrades signal quality.

The elements of this embodiment of switchable driver/receiver circuit 21 are interconnected as follows. Switch unit 41 is connected to the VCC line and to end 17 of bus line 16. Switch unit 41 is also connected to receive a control signal that enables/disables switch unit 41. In this embodiment, the control signal is signal VIN_DRVR.

Switch unit 42 is connected to the ground line and to end 17 of bus line 16. Switch unit 42 is also connected to receive a control line that enables/disables switch unit 42 so that when switch unit 42 is enabled, switch unit 41 will be disabled, and vice versa. In this embodiment, the control signal is the complement of signal VIN_DRVR (i.e., signal VIN_DRVR#).

Amplifier 43 has an input terminal electrically connected to bus line 16. In this embodiment, amplifier 43 is in an open loop configuration to function as a comparator, comparing the voltage of bus line 16 to a reference voltage. The reference voltage ideally has a level equal to the predefined threshold between logic high and logic low voltage levels. More particularly, amplifier 43 has a positive input terminal connected to bus line 16 and a negative input terminal connected to receive the reference voltage.

In operation, the agent containing switchable driver/receiver circuit 21 can provide signal VIN_DRVR with a logic high level to enable switch unit 41 and disable switch unit 42 to drive a logic high signal onto bus line 16 or to place circuit 21 in the receiver mode. This operation causes switch unit 41 to pull-up the voltage level at end 17 of bus line 16 through a 50 Ω termination impedance. As previously described, this 50 Ω impedance advantageously matches the characteristic impedance of bus line 16, thereby helping to reduce signal reflections on bus line 16, which tends to improve signal quality.

The agent can provide signal VIN_DRVR with a logic low level to disable switch unit 41 and enable switch unit 42 to drive a logic low signal onto bus line 16. Thus, switch unit 42 to provide a 25 Ω pull-down path while switch unit 41 is, in effect, open circuited. This operation results in about a two-thirds VCC voltage swing in driving a logic high signal and logic low signal onto bus line 16. This two-thirds VCC voltage swing is due to the voltage divider formed by the 50 Ω pull-up impedance of switchable driver/receiver circuit 22 (at the other end of bus line 16) and the 25 Ω pull-down impedance of switch unit 41. In addition, as previously described, the 25 Ω pull-down impedance of switchable driver/receiver circuit 21 more closely matches the 50 Ω characteristic impedance of bus line 16 than the approximately 10 Ω equivalent resistance of conventional driver/receiver circuit 13 (FIG. 1). Further, because switch unit 41 is disabled and has a relatively high resistance, switchable driver/receiver circuit 21 reduces power dissipation while driving a logic low signal compared to conventional driver/receiver circuit 13, which dissipates power through resistor 11 (FIG. 1) and has about one-half the pull-down impedance.

In the receiver mode, amplifier 43 compares the voltage of bus line 16 to the reference voltage and outputs a signal VOUT_RCVR with a logic level that depends on the comparison. In this embodiment, if the voltage at bus line 16 is higher than the reference voltage, amplifier 43 outputs signal VOUT_RCVR with a logic high level. Conversely, if the voltage at bus line 16 is lower than the reference voltage, amplifier 43 outputs signal VOUT_RCVR with a logic low level. In an alternative embodiment, amplifier 43 may be connected with its negative input terminal to receive the bus line voltage and its positive input terminal connected to receive the reference voltage. In this alternative embodiment, amplifier 43 would output the inverse of the logic level of bus line voltage.

Figure 5:
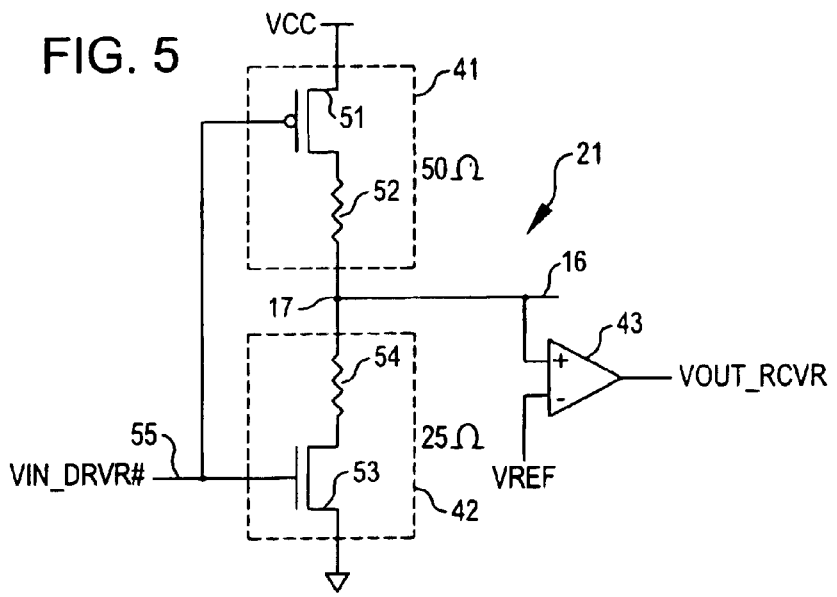
FIG. 5 is a schematic diagram illustrating an implementation of the switchable driver/receiver circuit of FIG. 4, according to one embodiment of the present invention.

FIG. 5 illustrates an implementation of switchable driver/receiver circuit 21 (FIG. 4), according to one embodiment of the present invention. In this embodiment, switch unit 41 is implemented with a P-channel transistor 51 and a resistor 52, whereas switch unit 42 is implemented with a N-channel transistor 53 and a resistor 54. Resistor 52 has a value selected so that when combined with the impedance of P-channel transistor 51 (when fully turned on) the resulting impedance is 50 Ω. Similarly, resistor 54 has a value selected so that when combined with the impedance of N-channel transistor 53 (when fully turned on) the resulting impedance is 25 Ω. In addition, this embodiment includes amplifier 43 as in FIG. 4. In one embodiment, resistors 52 and 54 are implemented as N-well resistors.

The elements of this embodiment of switchable driver/receiver circuit 21 are interconnected as follows. P-channel transistor 51 has its source connected to the VCC line, its drain connected to one terminal of resistor 52, and its gate connected to receive signal VIN_DRVR# via a signal line 55. The other terminal of resistor 52 is connected to end 17 of bus line 16. By using a P-channel transistor in this embodiment, the agent containing switchable driver/receiver circuit 21 need not generate signal VIN_DRVR.

N-channel transistor 53 has its source connected to the ground line, its drain connected to one terminal of resistor 54, and its gate connected to receive signal VIN_DRVR# via line 55. The other terminal of resistor 54 is connected to end 17 of bus line 16. Amplifier 43 is connected as described above in conjunction with FIG. 4.

In operation, when signal VIN_DRVR# is at a logic low level (e.g., to drive a logic high signal onto bus line 16 or to place switchable driver/receiver circuit 21 in the receiver mode), P-channel transistor 51 is turned on and N-channel transistor 53 is turned off. Thus, a 50 Ω pull-up path is created between end 17 of bus line 16 and the VCC line, while switch unit 42 disconnects end 17 from the ground line. Conversely, when signal VIN_DRVR# is at a logic high level (e.g., to drive a logic low signal onto bus line 16), P-channel transistor 51 is turned off and N-channel transistor 53 is turned on. Thus, a 25 Ω pull-down path is created between end 17 and the ground line, while switch unit 41 disconnects end 17 from the VCC line. Thus, this embodiment of switchable driver/receiver circuit 21 performs operations that are equivalent to the operations described above in conjunction with FIG. 4.

Figure 6:
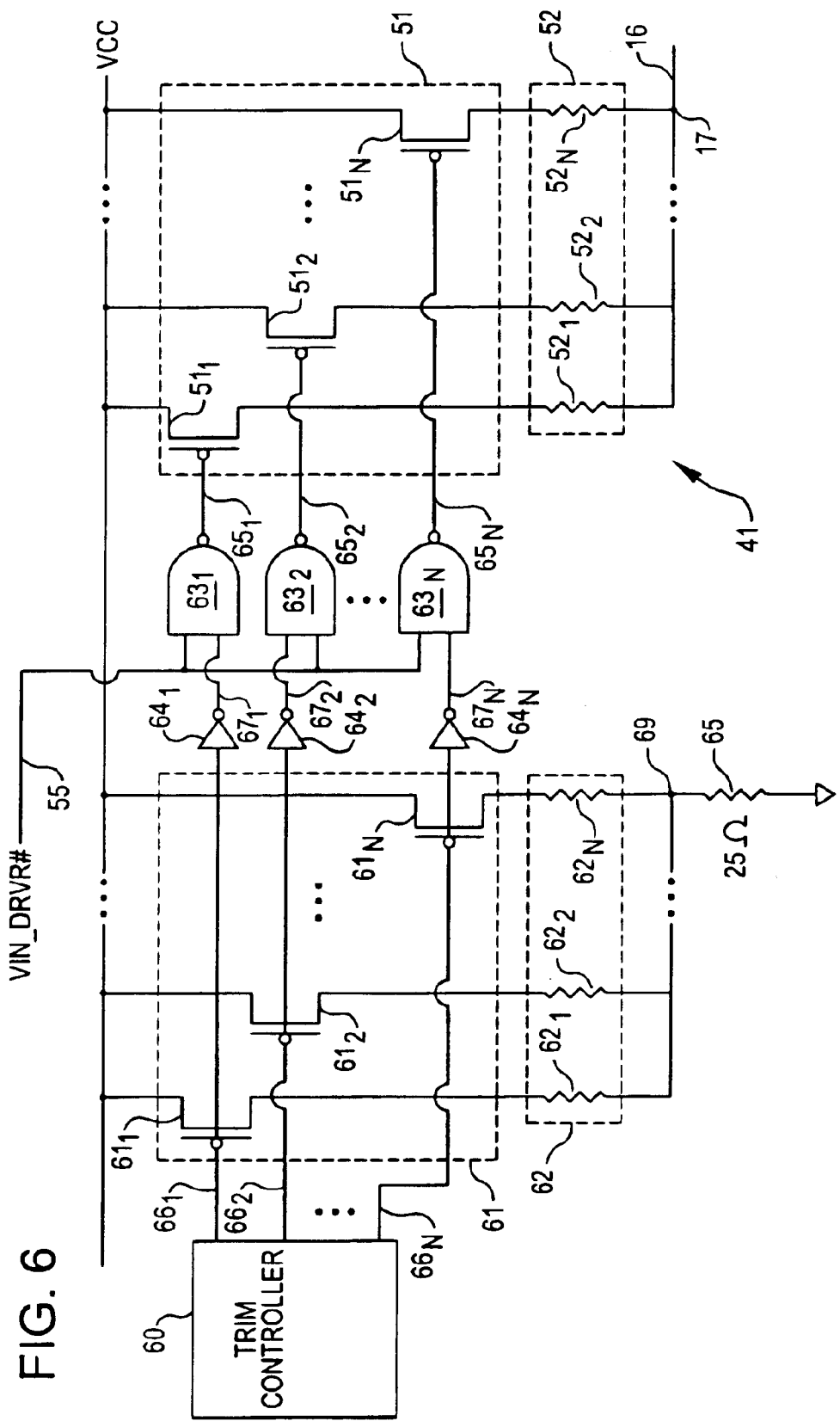
FIG. 6 is a schematic diagram illustrating a switchable driver/receiver circuit with impedance trimming, according to one embodiment of the present invention.

FIG. 6 illustrates switch unit 41, according to one embodiment of the present invention. In this embodiment, switch unit 41 is substantially identical to switch unit 41 (FIG. 5) except that this embodiment includes a trim unit and P-channel transistor 51 is implemented with component P-channel transistors $51_1$–$51_N$ and resistor 52 is implemented with component resistors $52_1$–$52_N$. In this embodiment, the trimming unit includes a trim controller 60, a dummy P-channel transistor 61 made of component P-channel transistors $61_1$–$61_N$, a dummy resistor 62 made of component resistors $62_1$–$62_N$, NAND gates $63_1$–$63_N$, inverters $64_1$–$64_N$, and an external reference impedance 65. In some embodiments, inverters $64_1$–$64_N$ can be replaced with a register or latch.

In this embodiment, the external reference impedance is implemented with a resistor whose resistance is accurately known. For example, in one embodiment, external reference impedance 65 is selected to have an impedance that ideally is 25 Ω. In this way, when the trimming unit is trimmed to have an impedance of 50 Ω, the resulting voltage across reference impedance 65 will be two-thirds VCC (i.e., the trip point between a logic high and a logic low level in this embodiment).

The elements of this embodiment of switch unit 41 are interconnected as follows. The drains of component P-channel transistors $51_1$–$51_N$ are connected to terminals of component resistors $52_1$–$52_N$, respectively. The gates of component P-channel transistors $51_1$–$51_N$ are respectively connected to the output leads of two-input NAND gates $63_1$–$63_N$ via control lines $65_1$–$65_N$. The sources of component P-channel transistors $51_1$–$51_N$ are connected to the VCC line. In one embodiment, the sizes of component P-channel transistors $51_1$–$51_N$ and component resistors $52_1$–$52_N$ are binarily weighted to achieve a relatively wide range of uniformly distributed impedances.

The gates of dummy component P-channel transistors $61_1$–$61_N$ are connected to trim controller 60 via control lines $66_1$–$66_N$, respectively. The sources of component P-channel transistors $61_1$–$61_N$ are connected to the VCC line. The drains of dummy component P-channel transistors $61_1$–$61_N$ are connected to terminals of dummy component resistors $62_1$–$62_N$, respectively. The other terminals of dummy resistors $62_1$–$62_N$ are connected to a node 69. External reference impedance 65 has one terminal connected node 69 and its other terminal to the ground line. Inverters $64_1$–$64_N$ have their input terminals respectively connected to lines $66_1$–$66_N$, and have their output terminals respectively connected to input terminals of NAND gates $63_1$–$63_N$ via lines $67_1$–$67_N$. The other input terminals of NAND gates $63_1$–$63_N$ are connected to line 55 to receive signal VIN_DRVR#.

Trim controller 60 can also be used to trim the P-channel pull-up devices in the driver/receiver circuit of the other bus lines of AGTL-type bus 16 (rather than having each driver/receiver circuit duplicating the trim controller). In such an embodiment, lines $67_1$–$67_N$ would also connected to NAND gates of these other driver/receiver circuits.

During a calibration operation, trim controller 60 compares the combined series impedance of dummy P-channel transistor 61 and resistor 62 to external reference impedance 65. For example, trim controller 60 can turn on one or more component transistors of dummy P-channel transistor 61 to conduct a current through dummy P-channel transistor 61, dummy resistor 52 and external reference impedance 65. Trim controller 60 then compares the voltage drop across external reference impedance 65 to a reference voltage (e.g., two-thirds VCC) to determine whether dummy P-channel transistor 61 and dummy resistor 62 provide a combined series impedance of 50 Ω. For example, trim controller 60 can include a differential amplifier (not shown) having its input terminals connected to node 69 and to a source of the reference voltage.

Depending on the detected voltage difference, trim controller 61 appropriately enables or disables (i.e., turns on or turns off) one or more of dummy component P-transistors $61_1$–$61_N$ so that the voltage drop across external reference impedance 65 matches one-third VCC as closely as possible. For example, this voltage drop would result when dummy P-channel transistor 61 and dummy resistor 62 have a combined impedance of 50 Ω and external reference impedance 65 has an impedance of 25 Ω. Thus, for example, if the detected voltage drop is greater than two-thirds VCC, the impedance of dummy P-channel transistor 61 is too low and, in response, trim controller 60 can disable one or more dummy component P-transistors $61_1$–$61_N$ that were enabled when the differential amplifier compared the voltages. In contrast, if the detected voltage drop is lower than two-thirds VCC, the impedance of dummy P-channel transistor 61 is too high and, in response, trim controller 60 can enable one or more dummy component transistors $61_1$–$61_N$ that were disabled when the differential amplifier compared the voltages.

Trim controller 60 can be configured to iteratively adjust the combined impedance to achieve an impedance that matches that of reference impedance 65 as closely as possible. These signals are then fed to the gates of component P-channel transistors $51_1$–$51_N$ through inverters $64_1$–$64_N$ and NAND gates $63_1$–$63_N$. In this way, if a particular dummy component transistor is enabled (i.e., trim controller 60 provides a logic low signal to the dummy component transistor's gate), the inverter provides a logic high level to the NAND gate, thereby causing the NAND gate to function as an inverter (and invert the signal provided on line 55).

In contrast, if a particular dummy component transistor is disabled by trim controller 60 (i.e., by providing a logic high gate signal), the corresponding inverter causes the corresponding NAND gate to receive a logic low level, which in turn causes this NAND gate to output a logic high level. Consequently, the corresponding component transistor of P-channel transistor 51 is turned off.

Switch unit 42 (FIG. 5) may include a similar trim controller to accurately achieve the desired pull-down impedance. In one embodiment, the reference impedance is implemented using dummy P-channel transistor 61 and dummy resistor 62 after they have been trimmed to provide an impedance of 50 Ω (as described above). Alternatively, a 50 Ω external reference resistor can be used. As previously described, in this embodiment N-channel transistor 53 and resistor 54 ideally have a combined series impedance of 25 Ω. The trim controller then trims the component N-channel transistors of N-channel transistor 53 (FIG. 5) in a similar manner to achieve a two-thirds VCC voltage drop across N-channel transistor 53.

Embodiments of method and apparatus for driving a signal using switchable on-die termination are described herein. In the above description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A circuit, comprising:
    a first switch unit connectable to a first power line, a control line, and a bus line of an assisted Gunning transceiver logic (AGTL) bus, the first switch unit having an impedance that substantially matches the characteristic impedance of the bus line, wherein the first switch unit is to electrically connect the first power line and the bus line when enabled by a control signal received via the control line, wherein the first switch unit is a P-channel transistor;
    a second switch unit connectable to a second power line and the bus line, the second switch unit having an impedance different from that of the first switch unit, wherein the second switch unit is to electrically connect the second power line and the bus line when enabled, the second switch unit to be disabled when the first switch unit is enabled and to be enabled when the first switch unit is disabled; and
    a trim circuit coupled to the P-channel transistor, wherein the trim circuit is to compare the impedance of the first switch unit to a reference impedance and to adjust the impedance of the first switch unit to substantially match the reference impedance.

2. The circuit of claim 1, wherein the second switch unit's impedance is half that of the first switch unit.

3. The circuit of claim 1, further comprising an amplifier having an input terminal connected to the bus line.

4. The circuit of claim 1, wherein the first switch unit further comprises a resistor connected in series with the P-channel transistor.

5. A The circuit of claim 1, wherein the resistor is an N-well resistor.

6. The circuit of claim 1, wherein the P-channel transistor comprises a plurality of component P-channel transistors, and wherein the trim circuit to adjust P-channel transistor's effective width-to-length ratio by selectively enabling one or more of the plurality of component P-channel transistors.

7. The circuit of claim 1, wherein the second switch unit comprises an N-channel transistor.

8. The circuit of claim 7, wherein the second switch unit further comprises a resistor connected in series with the N-channel transistor.

9. A circuit, comprising:
    first means for electrically connecting to a first power line and a bus line of an assisted Gunning transceiver logic (AGTL) bus when enabled, the first means having an impedance that substantially matches the bus line's characteristic impedance, wherein the first means is a P-channel transistor and the second means is an N-channel transistor;
    second means for electrically connecting a second power line and the bus line when enabled, the second means having an impedance different from that of the first means, wherein the second means is disabled when the first means is enabled and is enabled when the first means is disabled; and
    a trim circuit coupled to the P-channel transistor, wherein the trim circuit is to compare the impedance of the first means to a reference impedance and to adjust the impedance of the first means to substantially match the reference impedance.

10. The circuit of claim 9, wherein the impedance of the second means is half that of the first means.

11. The circuit of claim 9, wherein the first means further comprises a resistor connected in series with the P-channel transistor.

12. A system, comprising:
    an assisted Gunning transceiver logic (AGTL) bus;
    a first driver/receiver circuit coupled to one end of a bus line of the AGTL-type bus, the first driver/receiver circuit including:
        a first pull-up switch unit to couple a first power line to the bus line, wherein the first pull-up switch unit has an impedance substantially matching the bus line's characteristic impedance, wherein the first pull-up switch unit is a P-channel transistor having one terminal coupled to the first power line;
        a first pull-down switch unit coupled to a first ground line and to the bus line, wherein the first pull-down switch unit has an impedance different from that of the first pull-up switch unit; and
    a second driver/receiver circuit coupled to another end of the bus line, the second driver/receiver circuit including:
        a second pull-up switch unit to electrically connect a second power line to the bus line, the first and second power lines having substantially identical voltage levels, wherein the second pull-up switch unit has an impedance substantially matching that of the first pull-up switch unit,
        a second pull-down switch unit coupled to a second ground line and to the bus line, the first and second ground lines having substantially identical voltage levels, wherein the second pull-down switch unit has an impedance substantially matching that of the first pull-down switch unit; and a trim circuit coupled to the P-channel transistor, wherein the trim circuit is to compare the impedance of the first pull-up switch unit to a reference impedance and to adjust the impedance of the first pull-up switch unit to substantially match that of the reference impedance.

13. The system of claim 12, wherein the first pull-down switch unit's impedance is half that of the first pull-up switch unit.

14. The system of claim 12, wherein the first and second driver/receiver circuits each further comprise an amplifier having an input terminal connected to the bus line.

15. The system of claim 12, wherein the first pull-up switch unit further comprises a resistor connected in series with the P-channel transistor's channel.

16. The system of claim 12, wherein the P-channel transistor comprises a plurality of component P-channel transistors, and wherein the trim circuit is to adjust P-channel transistor's effective width-to-length ratio by selectively enabling one or more of the plurality of component P-channel transistors.

17. The system of claim 12, wherein the first pull-down switch unit comprises an N-channel transistor.

* * * * *